(12) United States Patent
Krissell et al.

(10) Patent No.: US 7,120,665 B2
(45) Date of Patent: Oct. 10, 2006

(54) SYSTEM AND METHOD FOR DYNAMIC NEGOTIATION OF DEVICE NAME LIST

(75) Inventors: Daniel L. Krissell, Kirkwood, NY (US); Thomas E. Murphy, Jr., Binghamton, NY (US); Francine M. Orzel, Endicott, NY (US); Kelly Parasida, Endicott, NY (US); Paul F. Rieth, Apalachin, NY (US); Jeffrey S. Stevens, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 10/202,342

(22) Filed: Jul. 23, 2002

(65) Prior Publication Data

US 2004/0019631 A1    Jan. 29, 2004

(51) Int. Cl.
*G06F 15/16* (2006.01)
(52) U.S. Cl. .................. 709/203; 709/227; 709/228
(58) Field of Classification Search ........ 709/220–222, 709/227–229
See application file for complete search history.

(56) References Cited

U.S. PATENT DOCUMENTS

| | | | |
|---|---|---|---|
| 6,076,110 A * | 6/2000 | Murphy, Jr. et al. | 709/228 |
| 6,101,552 A | 8/2000 | Chiang et al. | 709/245 |
| 6,789,111 B1 * | 9/2004 | Brockway et al. | 709/222 |
| 2002/0002607 A1 | 1/2002 | Ludovici et al. | 709/223 |
| 2002/0010865 A1 | 1/2002 | Fulton et al. | 713/201 |
| 2003/0055976 A1 * | 3/2003 | Hartmann et al. | 709/227 |

OTHER PUBLICATIONS

T. Murphy, Jr., et al. 5250 Telnet Enhancements. Network Working Group, RFC 2877 (Jul. 2000).*
Alexander, S. Telnet Environment Options, Network Working Group RFC 1572 (Jan. 1994).*
Transformation of World Delimiters. IBM Technical Disclose Bulletin, Jan. 1973, pp. 2379-2380.*
T. Murphy, Jr., et al. 5250 Telnet Enhancements. Network Working Group, Request for Comments (RFC) : 2877, Jul. 2000, p. 1-6.

* cited by examiner

*Primary Examiner*—Krisna Lim
*Assistant Examiner*—Brendan Y. Higa
(74) *Attorney, Agent, or Firm*—Shelley M. Beckstrand (57) ABSTRACT

System and method for client selection of a virtual device in a system including a server and a client provides for establishing a network connection between the client and server; establishing agreement between the server and client to negotiate Telnet options; communicating a list of device names from the client to the server for a virtual terminal device associated with the client; and responsive a device name from the list being available, communicating acceptance from the server to the client.

10 Claims, 3 Drawing Sheets

FIG. 1

PRIOR ART

FIG. 2

FIG. 3

SYSTEM AND METHOD FOR DYNAMIC NEGOTIATION OF DEVICE NAME LIST

BACKGROUND OF THE INVENTION

1. Technical Field of the Invention

This invention relates to device name negotiations for establishing a client/server session.

2. Background Art

Due to the fact that virtual device names on the IBM iSeries (AS400) server can only be requested one at a time, various problems exist. Many client emulators give the users an option to manually request a virtual device by name, which they then use during negotiations with a remote server to procure a virtual device on the server system (as defined in Murphy, et al. 5250 Telnet Enhancements, Network Working Group Request for Comments (RFC) 2877). Depending on the emulator, if the device is not available, some emulators just disconnect the session and it is up to the user to figure out why the connection failed. Some emulators auto-increment the device name (if DEVICE0001 is not available, DEVICE0002 is tried). This is only useful if users only care about the beginning of the device name matching. In many cases this is not good enough, such as when customers want one device name out of list of specific names. It is possible for emulators to request the user pick a different name device if the initial device requested is not available. This method requires a lot of user intervention by manually typing the device names possibly over and over again.

Another drawback to requesting one name at a time is network congestion. During Telnet negotiation, if the named device is not available the client and server must renegotiate to agree upon a name device. Table 1 sets forth an example of a Telnet negotiation in which name devices can be requested one at a time.

From the example of Table 1, this renegotiating of virtual device names may not seem like that much for one client. However, for example, on a Monday morning when many get to work and try to log in, there may be thousands of client emulators all negotiating at the same time. This will significantly add to network congestion. Also, if these clients are all connecting to the same Telnet server, the server must not only handle steady state client requests (clients already having a session established) but must also handle the thousands of negotiating clients trying to agree upon a virtual device name. This can put quite a strain on the server, as well as the other applications running on the iSeries that have to share CPU cycles with it.

It is an object of the invention to provide an improved system and method for establishing client/server sessions.

SUMMARY OF THE INVENTION

System and method for client selection of a virtual device in a system including a server and a client provides for establishing a network connection between the client and server; establishing agreement between the server and client to negotiate options; communicating a list of device names from the client to the server for a virtual terminal or printer device associated with the client; and responsive to a device name from the list being available, communicating acceptance from the server to the client.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
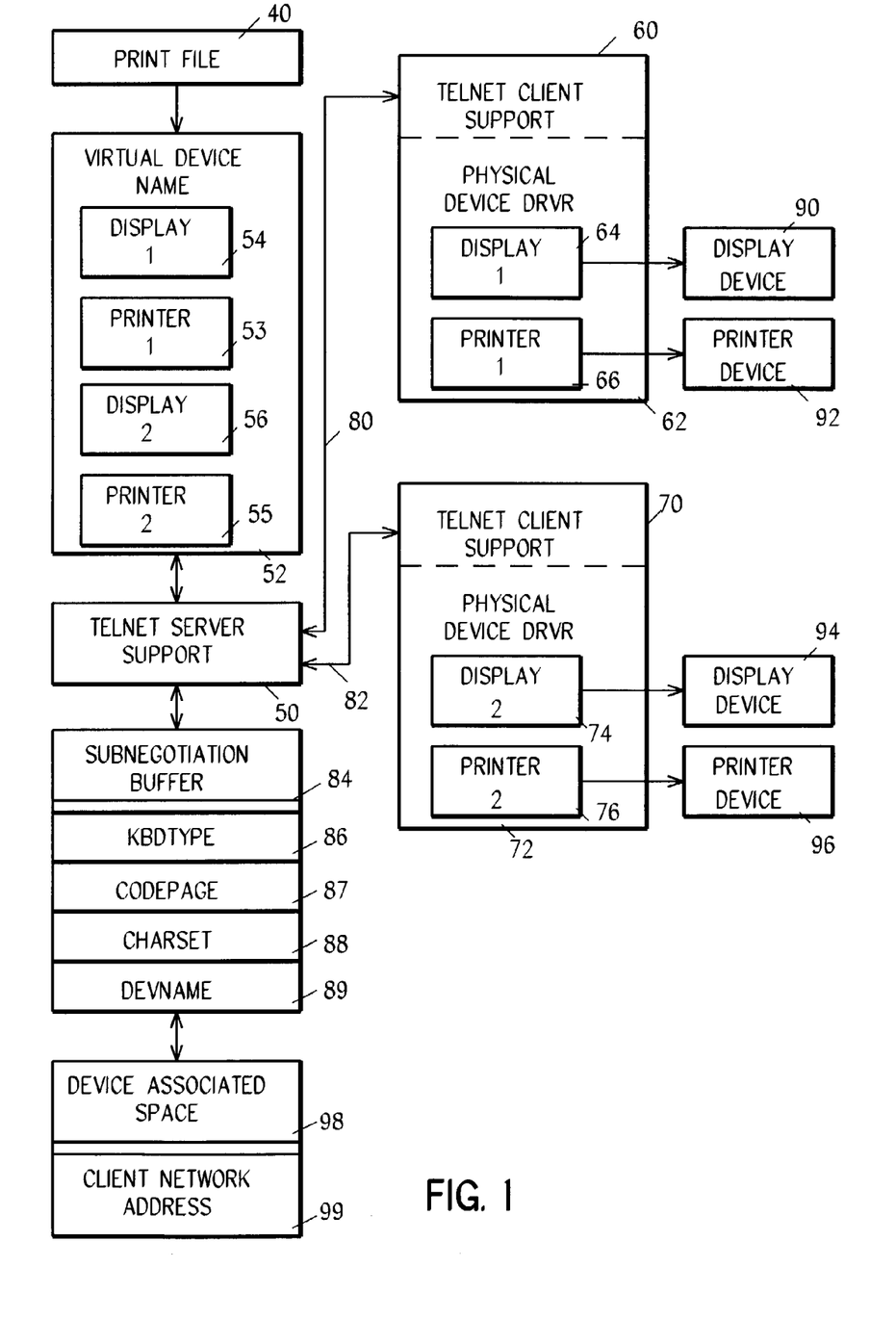
FIG. 1 is a high level system diagram illustrating a client/server system.

Referring to FIG. 1, Telnet clients 60 and 70 are connected to Telnet server 50 by TCP/IP communication links 80 and 82, respectively. At client 60, physical device drivers 62 include display 1 driver 64 connected to physical display device 90 and printer 1 driver 66 connected to physical printer device 92. At client 70, physical device drivers 72 include display 2 driver 74 connected to physical display device 94 and printer 2 device driver 76 connected to physical printer device 96. At server 50, virtual devices 52 include display 1 54, printer 1 53, display 2 56 and printer 2 55. These virtual devices 52 represent device support application code in server 50.

In operation, by way of an introductory overview, client 60 logs on to server 50, runs an application which creates, for example, a print file 40. Print file 40 is fed to virtual printer 1 53 which sends it over network 80 to printer 1 driver 66 to be printed at printer device 92.

Client 60 uses standard RFCs to request one of the virtual device names 53–56. These device names 53–56 represent a particular device 90–96 that exists on the client system. If the virtual device name 53–56 does not exist for a device 90–96 when requested, it is created.

Further in operation, Telnet server 50 receives a device specific datastream and sends it to virtual device 52. Virtual device 52 processes the data and builds a corresponding datastream that is returned to Telnet client 60. Depending upon the virtual device name 52 selected, the datastream can be a display datastream from virtual device 54 directed to driver 64 and display 90, or a printer datastream from virtual device 53 directed to driver 66 and device 92.

In RFC 854, the concept of a Network Virtual Terminal (NVT) is described. An NVT is an imaginary device which provides a standard, network-wide, intermediate representation of a canonical terminal. This eliminates the need for "server" and "client" hosts to keep information about the characteristics of each other's terminals and terminal handling conventions. All hosts, both client and server, map their logical device characteristics and conventions so as to appear to be dealing with an NVT over the network, and each can assume a similar mapping by the other party. The NVT is intended to strike a balance between being overly restrictive (not providing hosts a rich enough vocabulary for mapping into their local character sets), and being overly inclusive (penalizing users with modest terminals). As used herein, the "client" host is the host to which the physical user terminal is normally attached, and the "server" host is the host which is normally providing some service. In applications involving terminal-to-terminal or process-to-process communications, the "client" host is the host which initiates the communication.

Also, in RFC 854, the principle of negotiated options is described. Some hosts will wish to provide services additional to those available within an NVT, and some users will have sophisticated terminals and would like to have elegant, rather than minimal, services. To set up the use of an option, either party initiates a request that some option take effect. The other party may then either accept or reject the request. If the request is accepted the option immediately takes effect; if it is rejected the associated aspect of the connection remains as specified for an NVT. A party may always refuse a request to enable, and must never refuse a request to disable some option since all parties must be prepared to support the NVT.

The structure for communicating option status and changes involves the TELNET commands WILL, WONT, DO, and DON'T. A TELNET command includes at least a two byte sequence: the Interpret As Command (IAC) escape character followed by the code for the command.

WILL (option code) indicates a desire to begin performing the option, or confirms that the option is now being performed.

WONT (option code) indicates a refusal to perform or to continue performing the option.

DO (option code) indicates a request that the other party perform the option, or confirms that the other party is expected to perform the option.

DON'T (option code) indicates a demand that the other party stop performing the option, or confirms that the other party is no longer expected to perform the option.

Independent of but structured within the Telnet Protocol are various sanctioned communication options that are used with the "DO, DONT, WILL, WONT" structure to allow a user and server to agree to use a different or more elaborate set of conventions for their Telnet connection. Such options may include changing the character set, echo mode, and so forth.

RFC 855 describes a subnegotiation procedure for enabling more elegant communication solutions between dissimilar devices than is possible within the framework provided by RFC 854 for Network Virtual Terminals (NVT), where a single option code is communicated.

Subnegotiation occurs in accordance with the following steps. First, the parties agree to discuss parameters in the normal manner: one party proposes the use of the option by sending a DO or WILL followed by the option code, and the other party accepts by returning a WILL or DO followed by the option code. Once both parties have agreed to use the option, subnegotiation takes place by using the command Subnegotiation Begin (SB), followed by the option code, followed by the parameter(s), followed by the command Subnegotiation End (SE). Each party is able to parse the parameter(s), since each has indicated by the initial exchange of WILL and DO that the option is supported. Alternatively, the receiver may locate the end of a parameter string by searching for the SE command (that is, the string IAC SE), even if the receiver is unable to parse the parameters. Either party may refuse to pursue further subnegotiation at any time by sending a WONT or DON'T to the other party. Thus, for option "ABC", which requires subnegotiation to pass a parameter list in addition to the option code, the following TELNET commands may be passed:

IAC WILL ABC
IAC DO ABC
IAC SB ABC <parameters> IAC SE

In this sequence, an offer to use ABC is followed by a favorable acknowledgment of the offer, which is followed by one step of negotiation.

Alternatively, the sequence of commands may be:
IAC DO ABC
IAC WILL ABC
IAC SB ABC <parameters> IAC SE A request for the other party to use option ABC is followed by a favorable acknowledgment of the request, which is followed by one step of negotiation.

RFC 1205 describes the IBM 5250 TELNET interface. To enable 5250 mode, both the client and the server agree to at least support the Binary, End-of-Record (EOR), and Terminal-Type Telnet options set forth in RFCs 856, 885, and 884, respectively.

With the binary transmission option in effect, the receiver interprets characters received from the transmitter which are not preceded with IAC as 8 bit binary data, with the exception of IAC followed by IAC which stands for the 8 bit binary data with the decimal value 255. IAC followed by an effective TELNET command (plus any additional characters required to complete the command) is still the command even with the binary transmission option in effect. The meanings of WONT and DON'T are dependent upon whether the connection is presently being operated in binary mode or not. When a connection is not presently operating in binary mode, the default interpretation of WONT and DON'T is to continue operating in the current mode, whether it is NVT ASCII, EBCDIC, or some other mode. Once a connection is operating in a binary mode as agreed to by both parties, a WONT or DON'T causes the encoding method to revert to NVT ASCII.

With the TELNET End-of-Record (EOR) option in effect on a connection between a sender of data and the receiver of the data, the sender transmits EORs. Otherwise, EORs are interpreted as null operations (NOPs.)

The TERMINAL-TYPE option allows a TELNET server to determine the type of terminal connected to a user TELNET terminal. The information obtained may be passed to a process, which may alter the data it sends to suit the particular characteristics of the terminal. By using the TERMINAL-TYPE and BINARY options, a TELNET server program may arrange to have terminals driven as if they were directly connected, including such special functions as cursor addressing, multiple colors, etc. not included in the Network Virtual Terminal (NVT) specification. WILL and DO are used to obtain and grant permission for future discussion, and the actual exchange of status information occurs within option subcommands (IAC SB TERMINAL-TYPE . . . ). A list of valid terminal types is found at the IANA website, at http://www.iana.com.

An example of a typical negotiation process to establish 5250 mode of operation for a client having an IBM 5251-11 terminal is as follows. In this example, the server initiates the negotiation by sending the DO TERMINAL-TYPE request.

| Server: | IAC DO TERMINAL-TYPE |
|---|---|
| Client: | IAC WILL TERMINAL-TYPE |
| Server: | IAC SB TERMINAL-TYPE SEND IAC SE |
| Client: | IAC SB TERMINAL-TYPE IS IBM-5251-11 IAC SE |
| Server: | IAC DO END-OF-RECORD |
| Client: | IAC WILL END-OF-RECORD |
| Server: | IAC WILL END-OF-RECORD |
| Client: | IAC DO END-OF-RECORD |
| Server: | IAC DO TRANSMIT-BINARY |
| Client: | IAC WILL TRANSMIT-BINARY |
| Server: | IAC WILL TRANSMIT-BINARY |
| Client: | IAC DO TRANSMIT-BINARY |

Figure 2:
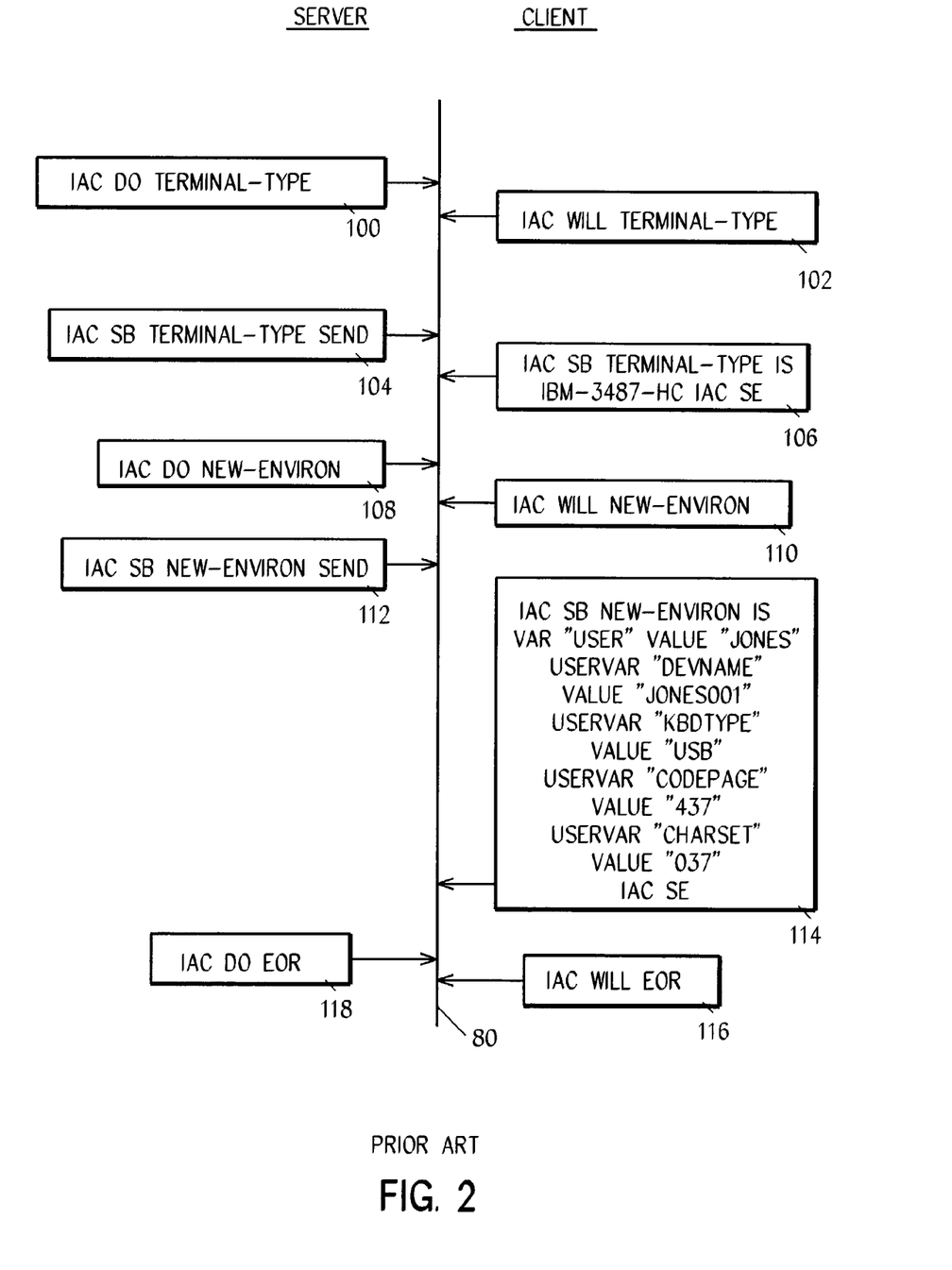
FIG. 2 is a flow diagram illustrating Telnet negotiations in accordance with the prior art.

Referring to FIG. 2, a user specifies a virtual device name of a Telnet session through an option negotiation handshaking sequence. The Telnet server informs the Telnet Client that a "NEW-ENVIRON" option can be negotiated. This option allows the Client application to negotiate with the Server to pick a device name that the Client wants. This negotiation includes the following steps.

In step 100, server 50 sends the Telnet command "DO TERMINAL-TYPE" to client 60.

In step 102, client 60 responds with the Telnet command "WILL TERMINAL-TYPE".

In step 104, server 50 sends the sub-negotiation command "SB TERMINAL-TYPE SEND" for the terminal-type option.

In step 106, client 60 responds to the sub-negotiation terminal type command 104 by sending any valid supported terminal type, herein illustrated as "SB TERMINAL-TYPE IS IBM-3487-HC IAC SE".

In step 108, in this exemplary embodiment, server 50 tests if client 60 is capable of handling negotiations by sending the Telnet command "DO NEW-ENVIRON". Alternatively, this command may be bundled with the "DO TERMINAL-TYPE" command in step 100.

In step 110, client 60 responds to the "DO NEW-ENVIRON" command with (1) "WILL NEW-ENVIRON", if it supports the method of the invention, or (2) "WONT NEW-ENVIRON", if it does not.

In step 112, server 50 sends the sub-negotiation command for the environment option "SB NEW-ENVIRON SEND".

In step 114, client 60 responds by passing up environment option information, including in this example values for the variables USER and device name (DEVNAME). In this specific example for negotiating a device name which is a display terminal, keyboard type (KBDTYPE), code page (CODEPAGE), and character set (CHARSET) are also communicated. In this response, client 60 reflects appropriate values for each of these parameters based upon a language and/or device name and sends this information to server 50 via environment option variables.

Server 50 uses the environment option information passed in step 114 from client 60 to select or create a virtual device description 52.

In step 118, server continues with normal transparent mode negotiations. (Alternatively, when the "DO NEW-ENVIRON" command is bundled in step 100, this "DO EOR" command may sent before step 110, in which case client 60 would first respond to the deferred NEW-ENVIRON request and defer responding to the DO EOR to step 116.)

In steps 118, 116, assuming negotiation of the environment option completes successfully, server 50 and client 60 proceed to negotiations of other Telnet options, such as end of record (EOR) and binary, required to initiate a Telnet session.

Referring further to FIG. 1, an invitation to negotiate RFC 1572 style environment variables may be included in Telnet server 50 initial client session establishment. This is a DO NEW-ENVIRON invitation packaged with a DO TERMINAL TYPE invitation and sent to the client as the first packet of data to flow from server to client. A network station terminal, or any Telnet client 60 may respond with a positive acknowledgment to both of these invitations, causing server 50 to go into subnegotiation for each. Clients not prepared or wishing to take advantage of subnegotiation support, respond with a negative acknowledgment. If environment subnegotiation is to take place, the server requests the client to send its VARs (an RFC 1572 predefined set of environment variables) and any USERVARs (a set of user definable variables provided for by RFC 1572.) A telnet server subnegotiation buffer 84 holds environment variables passed from the Telnet client in this way. In connection with this embodiment of the invention, USERVARs hold values for keyboard KBDTYPE 86, code page CODEPAGE 87, character set CHARSET 88, and device name DEVNAME 89, and these are specifically scanned for in the subnegotiation buffer 84. Other VARs and USERVARs sent in by the client are ignored. Any or all of these four values 86–89 may be specified by the client, with the following rules applied by the server to fill in any missing values. If no DEVNAME 89 is supplied, a compatable QPADEVxxxx device is autoselected or created if necessary, and the KBDTYPE 86, CODEPAGE 87, AND CHARSET 88 values are updated to the values passed in or calculated for the current request. If KBDTYPE 86 is specified, but not CHARSET 88 and CODEPAGE 87, compatible values for CODEPAGE 87 and CHARSET 88 are derived. If KBDTYPE 86 is missing, KBDTYPE 86, CODEPAGE 87 and CHARSET 88 are determined from appropriate system values. If DEVNAME 89 only is supplied, and a device 52 by that name has previously been created, and is available, the device will be used as is—that is, the existing KBDTYPE 86, CODEPAGE 87, and CHARSET 88 as previously defined for that named device 52 are used. If DEVNAME 89 only is supplied, and a device 52 by that name does not already exist, the missing parameters are extracted from the appropriate system values, and the device is created subject to the QAUTOVRT system value as in current versions of Telnet. In the case of current clients, KBDTYPE 86, CODEPAGE 87 and CHARSET 88 values are retrieved from system values and DEVNAME 89 is allowed to be autoselected during device creation and initialization. The client Telnet network address 99 is stored by the server 50 in a Device Associated Space (DAS) 98 for retrieval and use by customer applications for remote printing, logging, client access support, and so forth.

Figure 3:
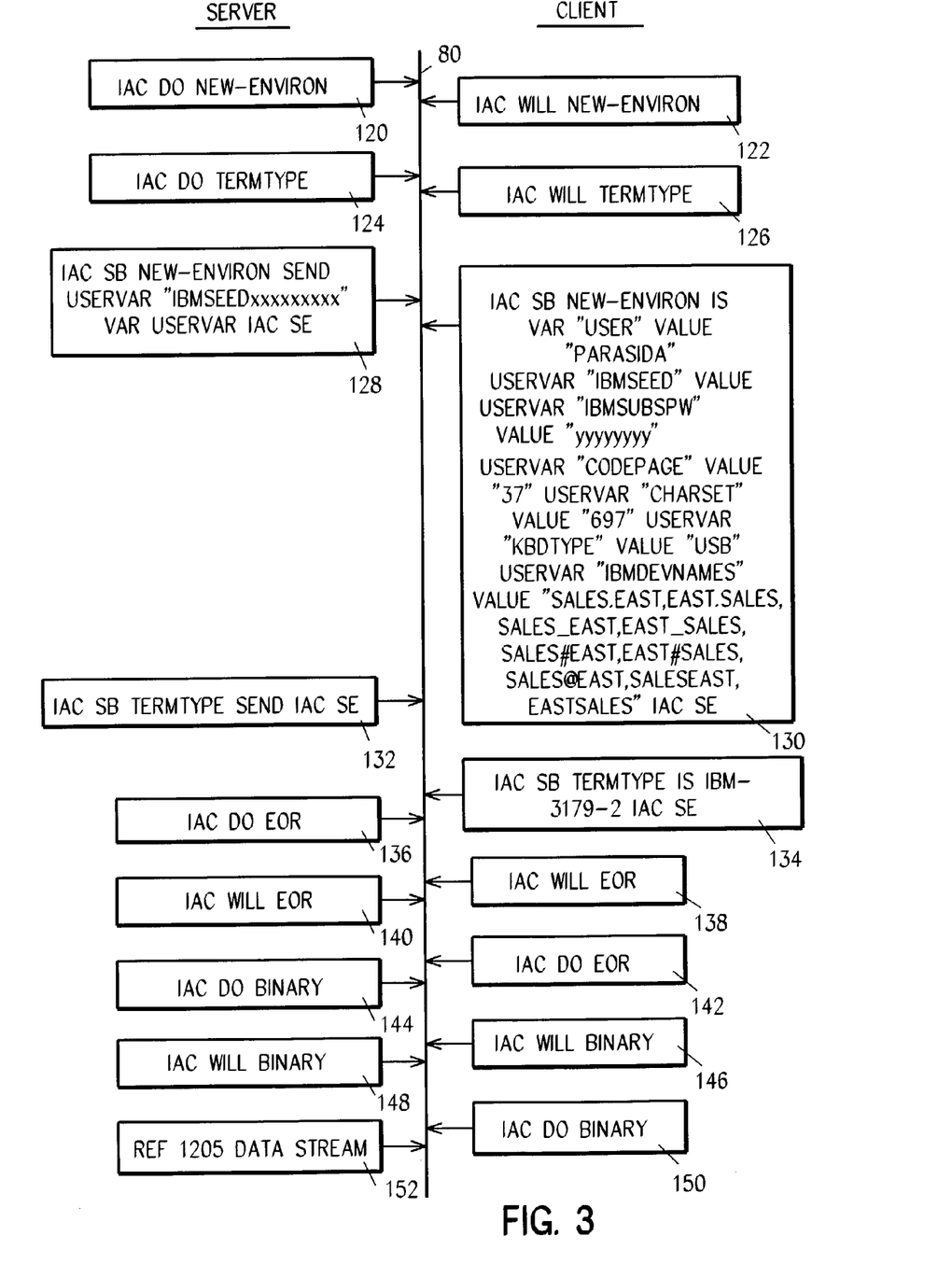
FIG. 3 is a flow diagram illustrating Telnet negotiations for selecting a virtual device name in accordance with the preferred embodiment of the invention.

Referring to FIG. 3, in accordance with the preferred embodiment of the invention, a system and method is provided for negotiating a list of possible virtual device names between a Telnet client (platform independent) and an iSeries Telnet server. Using this invention, a Telnet client sends the Telnet server a list of possible device names. The server then searches the list to find a device name that can be used by the client.

All the requested device names are passed at once by a client instead of having the server ask for one device name at a time. The server will not have to keep asking for a renegotiation of the virtual device name for each device that is not available. Instead, the server will only be required to request this renegotiation when all virtual device names asked for by the client are not available, and this should not happen often. Further, for example, if all listed DEVNAMEs in a first list of device names are locked, server 50 may be given the opportunity to retry by requesting a new DEVNAME list without breaking the session initiation connection; or client 60 may either quit (terminate the session) or request that a device name be selected from a pool of device names to continue processing. This decrease in network traffic (by both client and server) multiplied by a few thousand clients significantly eases network congestion and eliminates user frustration of having to restart the client emulator with a new device name several times.

In addition, this invention will also help users in that most emulators implementing the invention will most likely ask the user for a list of wanted device names and then "remember" the list in a server pool. This way the user will not have to re-enter the values for this saved connection.

This passing of a list of device names from the client to the server is accomplished via an environment variable/value during the sub-negotiation phase of the connection between the server and client. Table 2 sets forth an example of the Telnet connection negotiation between a client and server using the new environment variable.

In accordance with an exemplary embodiment of the invention, the new environment variable is IBM-DEVNAMES. The associated value in this example is a comma delimiter separated list of device names being requested, of which at most one will be granted. Since a comma is not allowed in a virtual device name, there is no escaping needed for the commas that separate the device names. If none of the device names the client requests are available, the client is asked to re-negotiate the device name as seen in the example of Table 1 (FFFA2701 03444556 4E414D45 FFF0).

In Tables 1 and 2, the Telnet commands WILL, WONT, DO, and DON'T comprise at least a two byte sequence: the Interpret As Command (IAC) escape character followed by the code for the command. SB signifies "subnegotiation begin", and SE "subnegotiation end". Each statement set is followed by the corresponding hexadecimal representation. WILL (option code) indicates a desire to begin performing the option, or confirms that the option is now being performed. WONT(option code) indicates a refusal to perform or to continue performing the option. DO (option code) indicates a request that the other party perform the option, or confirms that the other party is expected to perform the option. DON'T(option code) indicates a demand that the other party stop performing the option, or confirms that the other party is no longer expected to perform the option.

Referring to FIG. 3, the procedure of Table 2 is set forth. In step 120, server 50 tests if client 60 is capable of handling negotiations. In step 122, client 60 responds that it supports negotiations. In steps 124 and 126 the server and client exchange DO TERMTYPE and WILL TERMTYPE Telnet commands. In step 128, server 50 sends the subnegotiation Telnet command set IAC SB NEW-ENVIRON SEND USERVAR "IBMSEEDxxxxxxxx" VAR USERVAR IAC SE to client 60. In accordance with the present invention, in step 130 the response from client 60 includes USERVAR "IBMDEVNAMES" VALUE followed by a list of device names from which server 50 may select a device name for this connection. In steps 132 to 152, negotiations continue to normal completion. When a first list of device names does not include a device name that can be used, a second list of device names may be requested without breaking the server/client connection.

TABLE 1

DEVICE NAME NEGOTIATIONS
TN5250E Environment Option Negotiations

| Telnet Server | | Telnet Client |
|---|---|---|
| IAC DO NEW-ENVIRON FFFD27 | -> | |
| | <- | IAC WILL NEW-ENVIRON FFFB27 |
| IAC DO TERMTYPE FFFD18 | -> | |
| | <- | IAC WILL TERMTYPE FFFB18 |
| IAC SB NEW-ENVIRON SEND USERVAR "IBMRSEEDxxxxxxxx" VAR USERVAR IAC SE FFFA2701 0349424D 52534545 447D68B9 2BE04E04 040003FF F0 | -> | |
| | | IAC SB NEW-ENVIRON IS |

TABLE 1-continued

DEVICE NAME NEGOTIATIONS
TN5250E Environment Option Negotiations

| Telnet Server | | Telnet Client |
|---|---|---|
| | | VAR "USER" VALUE "PARASIDA" USERVAR "IBMRSEED" VALUE USERVAR "IBMSUBSPW" VALUE "yyyyyyyy" USERVAR "DEVNAME" VALUE "MYDEVICE01" USERVAR "CODEPAGE" VALUE "37" USERVAR "CHARSET" VALUE "697" USERVAR "KBDTYPE" VALUE "USB" |
| | <- | IAC SE FFFA2700 00555345 52015041 52415349 44410349 424D5253 45454401 04696CD0 D7C41F81 0349424D 53554253 50570131 96A30203 3F5321FD 03444556 4E414D45 014D5944 45564943 45303103 434F4445 50414745 01333703 43484152 53455401 36393703 4B424454 59504501 5553FFF0 |
| IAC SB NEW-ENVIRON SEND FFFA2701 03444556 4E414D45 FFF0 | -> | |
| | | IAC SB NEW-ENVIRON IS USERVAR "DEVNAME" VALUE |
| | <- | "MYDEVICE02" FFFA2700 03444556 4E414D45 014D5944 45564943 453032FF F0 |
| IAC SB NEW-ENVIRON SEND FFFA2701 03444556 4E414D45 FFF0 | -> | |
| | | IAC SB NEW-ENVIRON IS USERVAR "DEVNAME" VALUE |
| | <- | "MYDEVICE03" FFFA2700 03444556 4E414D45 014D5944 45564943 453033FF F0 |
| IAC SB NEW-ENVIRON SEND FFFA2701 03444556 4E414D45 FFF0 | -> | |
| | | IAC SB NEW-ENVIRON IS USERVAR "DEVNAME" VALUE |
| | <- | "MYDEVICE04" FFFA2700 03444556 4E414D45 014D5944 45564943 453034FF F0 |
| IAC SB NEW-ENVIRON SEND FFFA2701 03444556 4E414D45 FFF0 | -> | |
| | | IAC SB NEW-ENVIRON IS USERVAR "DEVNAME" VALUE |
| | <- | "MYDEVICE05" FFFA2700 03444556 4E414D45 014D5944 45564943 453035FF F0 |
| IAC SB NEW-ENVIRON SEND FFFA2701 03444556 4E414D45 FFF0 | -> | |
| | | IAC SB NEW-ENVIRON IS USERVAR "DEVNAME" VALUE |
| | <- | "MYDEVICE06" |

TABLE 1-continued

DEVICE NAME NEGOTIATIONS
TN5250E Environment Option Negotiations

| Telnet Server | | Telnet Client |
|---|---|---|
| | | FFFA2700 03444556 4E414D45 014D5944 45564943 453036FF F0 |
| IAC SB NEW-ENVIRON SEND FFFA2701 03444556 4E414D45 FFF0 | -> | |
| | | IAC SB NEW-ENVIRON IS USERVAR |
| | <- | "DEVNAME" VALUE "MYDEVICE07" FFFA2700 03444556 4E414D45 014D5944 45564943 453037FF F0 |
| IAC SB TERMTYPE SEND IAC SE FFFA1801 FFF0 | -> | |
| | | IAC SB TERMTYPE IS IBM-3179-2 |
| | <- | IAC SE FFFA1800 49424D2D 33313739 2D32FFF0 |
| IAC DO EOR FFFD19 | -> | |
| | <- | IAC WILL EOR FFFB19 |
| IAC WILL EOR FFFB19 | -> | |
| | <- | IAC DO EOR FFFD19 |
| IAC DO BINARY FFFD00 | | |
| | <- | IAC WILL BINARY FFFB00 |
| IAC WILL BINARY FFFB00 | -> | |
| | <- | IAC DO BINARY FFFD00 |
| RFC 1205 Data Stream 001112A0 00000400 000304F3 0005D970 00FFEF | -> | |

TABLE 2

DEVICE NAME LIST NEGOTIATIONS
TN5250E Environment Option Negotiations

| Telnet Server | | Telnet Client |
|---|---|---|
| IAC DO NEW-ENVIRON FFFD27 | -> | |
| | <- | IAC WILL NEW-ENVIRON FFFB27 |
| IAC DO TERMTYPE FFFD18 | -> | |
| | <- | IAC WILL TERMTYPE FFFB18 |
| IAC SB NEW-ENVIRON SEND USERVAR "IBMRSEEDxxxxxxxx" VAR USERVAR IAC SE FFFA2701 0349424D 52534545 447D68B9 2BE04E04 040003FF F0 | -> | |
| | | IAC SB NEW-ENVIRON IS VAR "USER" VALUE "PARASIDA" USERVAR "IBMRSEED" VALUE "IBMSUBSPW" VALUE "yyyyyyyy" USERVAR "CODEPAGE" VALUE "37" USERVAR "CHARSET" VALUE "697" USERVAR "KBDTYPE" VALUE "USB" USERVAR "IBMDEVNAMES" VALUE "SALES.EAST, EAST.SALES, SALES_EAST, EAST_SALES, SALES#EAST, EAST#SALES, SALES@EAST, SALESEAST, EASTSALES" |
| | <- | IAC SE FFFA2700 00555345 52015041 52415349 44410349 424D5253 45454401 04696CD0 D7C41F81 0349424D 53554253 50570131 96A30203 3F5321FD 03434F44 45504147 45013337 03434841 52534554 01363937 034B4244 54595045 01555303 49424D44 45564E41 4D455301 53414C45 532E4541 53542C45 4153542E 53414C45 532C5341 4C45535F 45415354 2C454153 545F5341 4C45532C 53414C45 53234541 53542C45 41535423 53414C45 532C5341 4C455340 45415354 2C53414C 45534541 53542C45 41535453 414C4553 FFF0 |
| IAC SB TERMTYPE SEND IAC SE FFA1801 FEF0 | -> | |
| | | IAC SB TERMTYPE IS IBM-3179-2 |
| | <- | IAC SE FFFA1800 49424D2D 33313739 2D32FFF0 |
| IAC DO EOR FFFD19 | -> | |
| | <- | IAC WILL EOR FFFB19 |
| IAC WILL EOR FFFB19 | -> | |
| | <- | IAC DO EOR FFFD19 |
| IAC DO BINARY FFFD00 | | |
| | <- | IAC WILL BINARY FFFB00 |
| IAC WILL BINARY FFFB00 | -> | |
| | <- | IAC DO BINARY FFFD00 |
| RFC 1205 Data Stream 001112A0 00000400 000304F3 0005D970 00FFEF | | |

Advantages Over the Prior Art

It is an advantage of the invention that there is provided an improved system and method for establishing client/server sessions.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for client selection of a virtual device in a system including a server application and a client application, comprising:
    establishing a wide area network application connection between said client application and said server application;
    said server application determining if a previously saved list of device names has been saved to a server pool;
    responsive to finding said saved list in said server pool for said application connection, identifying in said previously saved list of device names a free device name for said application connection; and responsive to said server pool having no free device name,
        establishing agreement between said server application and said client application to negotiate options;
        communicating a delimiter separated list of device names from said client application to said server application for a virtual terminal or printer device associated with said client application, said delimiter being a character recognized by said server application and said client application as a delimiter character;
    said server application saving said list of device names to said server pool for said application connection;
    said server application examining said delimiter separated list of device names to identify a free device name; and
    responsive to a device name being available from one of said list and said server pool, communicating acceptance from said server application to said client application.

2. The method of claim 1, further comprising:
    responsive to all device names in said list being unavailable:
        communicating rejection from said server application to said client application; and
        without breaking said connection, selectively communicating from said client application to said server application a second list of a plurality of device names for said virtual terminal device.

3. The method of claim 1 wherein said step of establishing agreement comprises the further steps of:
    communicating DO TERMINAL-TYPE and DO NEW-ENVIRON invitations from said server application to said client application;
    communicating acknowledgment of said invitations from said client application to said server application;
    and wherein said step of communicating a list of device names comprises:
        entering a subnegotiation session including the steps of:
            communicating from said server application to said client application a request for predefined environment variables and for user definable variables;
            responsive to said request, communicating from said client application to said server application said list of device names as a user definable variable.

4. The method of claim 3 further comprising assigning said device name from a pool of available device names selectively in response to said device name being unavailable.

5. Method for client selection of a virtual device in a system including a server application and a client application, comprising the steps of:
    establishing a connection between said client application and said server application;
    establishing agreement between said server application and said client application to negotiate options;
    communicating a delimiter separated list of device names from said client application to said server application for a virtual terminal device associated with said client application;
    saving said list of device names to a server pool for said connection;
    responsive to a device name from said list of device names or said server pool being available, communicating acceptance from said server application to said client application;
    said server application examining said delimiter separated list of device names to identify a free device name;
    responsive to all said device names in said list of device names and in said server pool being unavailable:
        communicating rejection from said server application to said client application; and
        without breaking said connection, selectively communicating from said client application to said server application a second list of a plurality of device names for said virtual terminal device.

6. The method of claim 5 wherein said options comprise sanctioned communication options.

7. The method of claim 5 wherein said step of establishing agreement comprises the further steps of:
    communicating DO TERMINAL-TYPE and DO NEW-ENVIRON invitations from said server application to said client application;
    communicating acknowledgment of said invitations from said client application to said server application;
    and wherein said step of communicating a list of device names further comprises:
        entering a subnegotiation session including the steps of:
            communicating from said server application to said client application a request for predefined environment variables and for user definable variables; and
            responsive to said request, communicating from said client application to said server application said list of device names as a user definable variable.

8. The method of claim 7 further comprising assigning said device name from a pool of available device names selectively in response to said device name being unavailable.

9. Method for operating a server application in a system including said server application and at least one client application to enable said client application to select a virtual device name for a device associated with said client application, comprising the steps of:

accepting a connection with said client application;

responsive to determining that a server pool of device names contains no available device names for said connection, establishing agreement with said client application to negotiate options;

responsive to said agreement, receiving from said client application as a user definable variable a delimiter separated list of device names for a virtual device associate with said client application, said delimiter being a character recognized by said server application and said client application as a delimiter character, and saving said list of device names to said server pool for said connection;

determining if a device name in said list of device names or said server pool is available to said client application, and responsive thereto selectively communicating one of acceptance and rejection of said list of device names to said client application; and     without breaking said connection,         selectively receiving from said client application a second list of one or more device names or assigning said device name from a pool of available device names.

10. A program storage device readable by a machine, tangibly embodying a program of instructions executable by a machine to perform method steps for a server application in a system including at least one client application to enable said client application to select a virtual device name for a device associated with said client application, said method steps comprising:

accepting a connection with said client application;

establishing agreement with said client application to negotiate options;

responsive to said agreement, receiving from said client application and loading into a subnegotiation buffer a parameter string including one or more predefined variables and user definable variables;

scanning said subnegotiation buffer for a user definable variable specifying a plurality of device names in a delimiter separated list of device names for a virtual device associated with said client application, said delimiter being a character recognized by said server application and said client application as a delimiter character;

responsive to finding said user definable variable specifying a device name, saving said list of device names to a server pool and determining if a device name in said list of device names is available to said client application; and     responsive to not finding said user definable variable specifying a device name, assigning a device name to said virtual device associated with said client application.

\* \* \* \* \*